United States Patent [19]

Hinrichs

[11] 4,270,730
[45] Jun. 2, 1981

[54] MEANS TO RETAIN A VALVE STEM
[75] Inventor: John M. Hinrichs, Bryan, Tex.
[73] Assignee: ACF Industries, Incorporated, New York, N.Y.
[21] Appl. No.: 43,554
[22] Filed: May 29, 1979
[51] Int. Cl.³ .............................................. F16K 1/22
[52] U.S. Cl. .................................... 251/214; 251/308
[58] Field of Search ............... 251/214, 305, 306, 307, 251/308, 309, 313, 315

[56] References Cited

U.S. PATENT DOCUMENTS

| | | | |
|---|---|---|---|
| 3,038,693 | 6/1962 | Dumm | 251/315 |
| 3,334,862 | 8/1967 | Hookway, Jr. | 251/315 |
| 3,480,253 | 11/1969 | Priese et al. | 251/315 |
| 3,591,133 | 7/1971 | Miles et al. | 251/306 |
| 3,606,980 | 9/1971 | Simpson et al. | 251/305 |

FOREIGN PATENT DOCUMENTS 713168  9/1966  Italy ........................................ 251/315

Primary Examiner—William R. Cline
Assistant Examiner—H. Jay Spiegel
Attorney, Agent, or Firm—Eugene N. Riddle

[57] ABSTRACT

A retaining device to hold a butterfly valve stem (26) in the valve body upon a shearing or breaking of the stem. The retaining device is mounted within a bore (38) in the valve body (12) beneath the stem packing and includes pins (44) extending from the stem (26) which engage in abutting relation a support ring (64) mounted in a groove (56) in the bore to restrain any outward movement of the stem.

8 Claims, 6 Drawing Figures

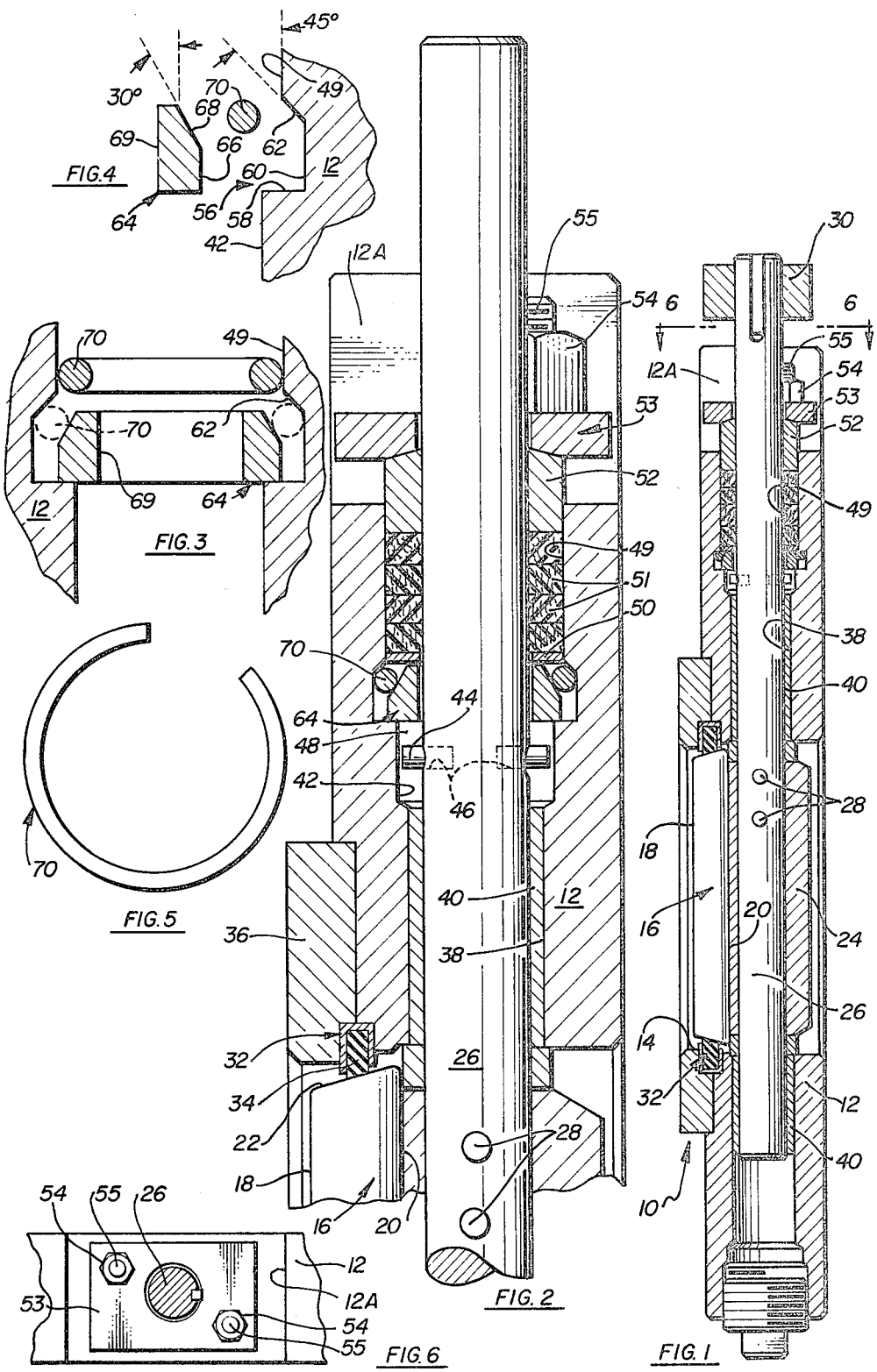

MEANS TO RETAIN A VALVE STEM

BACKGROUND OF THE INVENTION

A stem of a rotatable valve member, such as a butterfly valve, is weakened in certain areas such as, for example, the areas where pins secure the butterfly valve member to the stem. If an unusually high torque is placed on the stem, shear failure of the stem may occur and fluid pressure in the valve body under certain conditions may tends to urge or blow the sheared stem out of the bore resulting in possible injury to an operator of the valve. It is highly desirable that any device to prevent the blowout of a sheared stem be easily assembled within the bore of the valve body.

SUMMARY OF THE INVENTION

The present invention is directed generally to a butterfly valve having a body with a bore therein receiving a stem secured to a buterfly valve member. More specifically, the invention relates to means mounted within the bore to restrain outward movement of the stem from the body in the event of a shearing or breaking of the stem. The retaining means comprises a stop member on the stem which extends outwardly from the outer periphery of the stem, and a tapered support ring mounted in a groove in the bore adjacent the stem member to engage the stop member and restrain any outward movement of the stem. The tapered support ring is held in the groove by a split retainer ring which is easily inserted within the groove between a tapered outer periphery of the support ring and an opposed tapered groove surface. The split retainer ring expands outwardly to hold the support ring in position against the tapered groove surface thereby to prevent any outward movement of the stem.

DESCRIPTION OF THE INVENTION

FIG. 1 is a sectional view of a butterfly valve structure which incorporates the stem retention device comprising the present invention;

FIG. 2 is an enlarged fragment of FIG. 1 illustrating the stem retention device within the stem bore;

FIG. 3 is an enlarged section of the stem retention device of FIGS. 1-2 showing the split retainer ring prior to insertion;

FIG. 4 is an enlarged section of the groove in the bore of the valve body with the retainer ring and support ring of the retention device shown in section removed from the groove;

FIG. 5 is a top plan of the split retainer ring; and

FIG. 6 is a top plan taken generally along line 6—6 of FIG. 1.

Referring now to the drawings for a better understanding of the invention, and more particularly to FIG. 1, the butterfly valve structure generally indicated at 10 comprises a body 12 having a flow passage 14 therethrough. A butterfly valve disc indicated generally at 16 is mounted within the flow passage for movement between open and closed positions and comprises a front face 18, a rear face 20, and an outer peripheral sealing surface 22 extending about the outer periphery of valve disc 16 to form a generally spherical sealing surface. Rear face 20 has an integral sleeve 24 and a shaft or stem 26 fitting within sleeve 24 is secured thereto by suitable pins 28 to connect valve disc 16 for rotation with stem 26. A handle 30 is secured to the outer end of stem 26 for manual gripping and rotation of stem 26.

A seat assembly generally indicated at 32 has a resilient seal element 34 which is adapted to engage in sealing relation the adjacent sealing surface 22 of bufferfly valve disc 16. A retainer plate 36 is secured to body 12 to hold seat assembly 34 in position. Body 12 has a bore 38 receiving stem 26. A sleeve bearing 40 is positioned within bore 38 at the upper and lower ends of valve disc 16. Bore 38 has an intermediate diameter enlarged bore portion 42. Retainer pins 44 are driven within blind openings 46 in stem 26 and the ends of pins 44 extend outwardly from the outer periphery of stem 26 within chamber 48 formed by intermediate bore portion 42. A large diameter end bore portion 49 receives a plurality of packing rings 51 therein within are supported on a metallic end ring 50. A gland ring 52 fits around stem 26 against packing rings 51 and extends upwardly into a cutout portion of body 12 indicated at 12A. A gland retainer plate 53 fits over ring 52 and is retained by nuts 54 on studs 55 which are mounted in body 12. Plate 53 may be adjusted by nuts 54 to control the compressive forces exerted against packing rings 51 by gland ring 52.

As shown particularly in FIG. 4, an annular groove indicated generally at 56 is provided at the juncture of large diameter bore portion 49 and intermediate bore portion 42. Groove 56 is of an outer diameter greater than the diameter of large diameter bore portion 49. Groove 56 defines a lower shoulder or abutment 58, an outer peripheral wall surface 60 and an upper inclined or tapered shoulder defining surface 62 of a frusto-conical shape. A wedge support ring indicated generally at 64 fits about stem 26 and has an outer peripheral surface 66 with a frusto-conical or tapered end surface 68. The inner peripheral surface of ring 64 is indicated at 69. Surface 68 is arranged at around a thirty degree angle with respect to the longitudinal axis of stem 26 and surface 66. Tapered surface 62 defining groove 56 is arranged at around a forty-five degree angle with respect to the cylindrical surface defining the adjacent bore 49. A split retainer ring 70 is of a circular cross section and is positioned between tapered surface 62 and 68 defining groove 56 and wedge ring 64.

Pin 44, wedge ring 64, and split retainer ring 70 in combination with groove 56 define the retaining means for holding stem 26 within bore 38. In the event of any shearing of stem 26 below pin 44, fluid pressure from flow passage 14 tends to urge the upper sheared portion of the stem from bore 38, the ends of pin 44 will contact the lower surface of wedge ring 64 and urge wedge ring 64 upwardly against split ring 70. As shown in FIG. 3, split retain ring 70 is easily inserted between inclined surfaces 62 and 68. Since surface 68 diverges from the longitudinal axis of stem 26 less than the divergence of surface 62, upward movement of support ring 64 tightly urges split ring 70 against surface 62 thereby to limit upward movement of ring 64. Thus, pin 44 is restrained from outward movement by wedge ring 64 to prevent stem 26 from being blow out of valve body 12 upon any malfunctioning or shearing of valve stem 26.

The stem retaining device may be easily assembled within the bore of the valve body as wedge ring 64 can be inserted from the upper end of the body and be seated on shoulder 58. Then, split ring 70 may be inserted between surfaces 62 and 68 to hold wedge ring 64 in position. End packing ring 50 separates packing rings 51 from wedge ring 64 and may be inserted within the bore along with packing rings 51. Then, gland ring 52 and retainer plate 53 are added to hold packing rings 51 and the retaining means within the bore. Nuts 54 are threaded on studs 55 to provide a predetermined compressive loading of packing rings 51.

Tapered surfaces 62 and 68 may be formed, if desired, of different angles with respect to the longitudinal axis of stem 26 and function in a satisfactory manner so long as surface 62 is disposed at an angle greater than the inclination of surface 68 with respect to the longitudinal axis of stem 26 to insure that ring 70 is wedged tightly between surfaces 62 and 68. For example, surface 62 could be positioned between around thirty-five degrees (35°) and ninety degrees (90°) with respect to the longitudinal axis of stem 26 and function in a satisfactory manner.

It is to be understood that means other than pins 44 could be provided on stem 26 to engage ring 64 such as an annular shoulder, or separate snap ring in an annular groove in stem 26, for example.

What is claimed is:

1. In a valve structure having a valve body defining a valve chamber and a movable valve member mounted in the valve chamber for rotative movement between open and closed positions, a stem mounted within a bore in the valve body communicating with the valve chamber, said stem being secured to the movable valve member and having an outer end portion extending outwardly of the valve body, and means operatively connected to the outer end portion of the stem to rotate the valve member between open and closed positions;

an improved means mounted within an enlarged diameter bore portion to retain the stem in the valve body comprising:

a stop member on said stem extending outwardly from the outer periphery of the stem into the enlarged diameter bore portion;

an annular groove in said bore positioned both axially and radially outwardly of said stop member to define an outer peripheral surface and upper and lower annular shoulders adjacent the outer peripheral surface, said upper annular shoulder tapering axially outwardly and radially inwardly from said outer peripheral surface, a support ring mounted in said groove and seated on said lower annular shoulder, said support ring having a tapered outer peripheral surface, said upper annular shoulder being inclined with respect to the longitudinal axis of the stem at an angle greater than the inclination of the outer peripheral surface of said support ring; and a split ring mounted in the groove between the tapered outer surface of the support ring and the upper shoulder defined by the groove, whereby upon an outer axial movement of the stem said stop member contacts said support ring and said support ring is urged tightly against said split ring and said upper shoulder to restrain the outer axial movement of the stem.

2. In a valve structure as set forth in claim 1, wherein said upper annular shoulder of said groove is inclined at an angle of at least approximately thirty-five degrees with respect to the longitudinal axis of the stem, and said tapered outer peripheral surface is inclined at an angle less than that at which said upper annular shoulder is inclined with respect to the longitudinal axis of the stem.

3. In a valve structure as set forth in claim 1, wherein said stop member is spaced axially outward of said movable valve member.

4. In a butterfly valve structure having a valve body defining a flow passageway and a butterfly valve disc mounted in the passageway for rotative movement between open and closed positions, said body having a central bore therein, a stem mounted in said bore and secured to said valve disc, and means secured to an end of the stem for rotating the stem between open and closed positions; stem retaining means mounted in said bore to restrain the outward movement of the stem comprising:

a stop member on said stem extending outwardly from the outer periphery of the stem, an annular groove in the bore axially outward of the stop member, said annular groove defining an outer peripheral surface and upper and lower annular shoulders adjacent the peripheral surface, said upper annular shoulder tapering axially outwardly and radially inwardly from said outer peripheral surface;

a support ring mounted in said groove and having a tapered outer peripheral surface, said support ring extending inwardly into the bore to contact the stop member upon an axially outward movement of the stem to restrain such outward movement, said outer peripheral surface of said groove being inclined with respect to the longitudinal axis of the stem at an angle greater than the inclination of the outer peripheral surface of the support ring with respect to the longitudinal axis of the stem, and a retainer mounted between said upper annular shoulder and said support ring.

5. In a butterfly valve structure as set forth in claim 9, wherein an enlarged bore portion is provided outwardly of said groove and said support ring is of an outer diameter less than the diameter of said enlarged bore portion to permit the insertion of the support ring, and said retainer comprises a split retainer ring positioned in the groove outwardly of the support ring.

6. In a bufferfly valve structure having a valve body defining a valve chamber and a movable valve member mounted in the valve chamber for rotative movement between open and closed positions, a stem mounted within a bore in the valve body communicating with the valve chamber, said stem being secured to the movable valve member and having an outer end portion extending outwardly of the valve body, and means operatively connected to the outer end portion of the stem to rotate the valve member between open and closed positions; an improved means mounted within said bore to retain the stem in the valve body comprising:

a stop member on said stem extending radially outwardly from the outer periphery of the stem, a packing in the bore positioned axially outward of the stop member adjacent the outer periphery of the stem, an adjustable packing retainer engaging the packing to compress the packing, said bore having an intermediate diameter enlarged bore portion receiving said stop member and a large diameter enlarged bore portion receiving said packing;

an annular groove formed in said bore at the juncture of the intermediate and large diameter enlarged bore portions between said stop member and said packing, said annular groove being of a diameter greater than the large diameter enlarged bore portion and defining an outer peripheral surface and upper and lower shoulders adjacent said peripheral surface, a wedge support ring mounted in said groove and seated on said lower annular shoulder adjacent the stop member on said stem, said support ring being of an outer diameter less than the diameter of said large diameter enlarged bore portion for fitting therein and having a tapered outer end surface positioned in spaced relation adjacent said upper annular shoulder defined by said groove; and a split retainer ring mounted in the groove between said tapered outer end surface of the support ring and the upper annular shoulder defined by the groove to retain the support ring within the groove, whereby upon an outer axial movement of the stem said stop member contacts and urges said support ring tightly against said split ring and said outer shoulder to restrain the outer axial movement of the stem.

7. In a butterfly valve structure as set forth in claim 6, wherein said tapered outer end surface of the support ring is facing said upper annular shoulder and said upper shoulder is inclined with respect to the longitudinal axis of the stem at an angle greater than the inclination of said outer end surface of the support ring with respect to the longitudinal axis of the stem.

8. In a butterfly valve structure having a valve body defining a valve chamber and a movable valve member mounted in the valve chamber for rotative movement between open and closed positions, a stem mounted within a bore in the valve body communicating with the valve chamber, said stem being connected to the movable valve member and having an outer end portion extending outwardly of the valve body, and means operatively connected to the outer end portion of the stem to rotate the valve member between open and closed positions;

an improved means mounted within said bore to retain the stem in the valve body comprising:

a stop member on said stem extending radially outwardly from the outer periphery of the stem, a packing in the bore positioned axially outward of the stop member adjacent the outer periphery of the stem, an adjustable packing retainer engaging the packing to compress the packing, said bore having an intermediate diameter enlarged bore portion receiving said stop member and a large diameter enlarged bore portion receiving said packing;

an annular groove formed in said bore at the juncture of the intermediate and large diameter enlarged bore portions axially and radially outwardly of said stop member between said stop member and said packing, said annular groove being of a diameter greater than the large diameter enlarged bore portion and defining an outer peripheral wall surface and upper and lower shoulders adjacent said peripheral wall surface, a wedge ring mounted in said groove and seated on said lower annular shoulder, said wedge ring being of an outer diameter less than the diameter of said large diameter enlarged bore portion for fitting therein; and ring retaining means mounted in the groove between the wedge ring and the upper annular shoulder defined by the groove to retain the wedge ring within the groove, whereby upon an outer axial movement of the stem said stop member contacts said wedge ring and said wedge ring is wedged tightly against said ring retaining means to restrain the outer axial movement of the stem.

* * * * *

UNITED STATES PATENT AND TRADEMARK OFFICE
CERTIFICATE OF CORRECTION

PATENT NO. : 4,270,730
DATED : June 2, 1981
INVENTOR(S) : John M. Hinrichs

It is certified that error appears in the above-identified patent and that said Letters Patent are hereby corrected as shown below:

Column 4, line 32, change "9" to -- 4 --.

Signed and Sealed this

Twenty-ninth Day of June 1982

[SEAL]

Attest:

GERALD J. MOSSINGHOFF

Attesting Officer

Commissioner of Patents and Trademarks